UNITED STATES PATENT OFFICE.

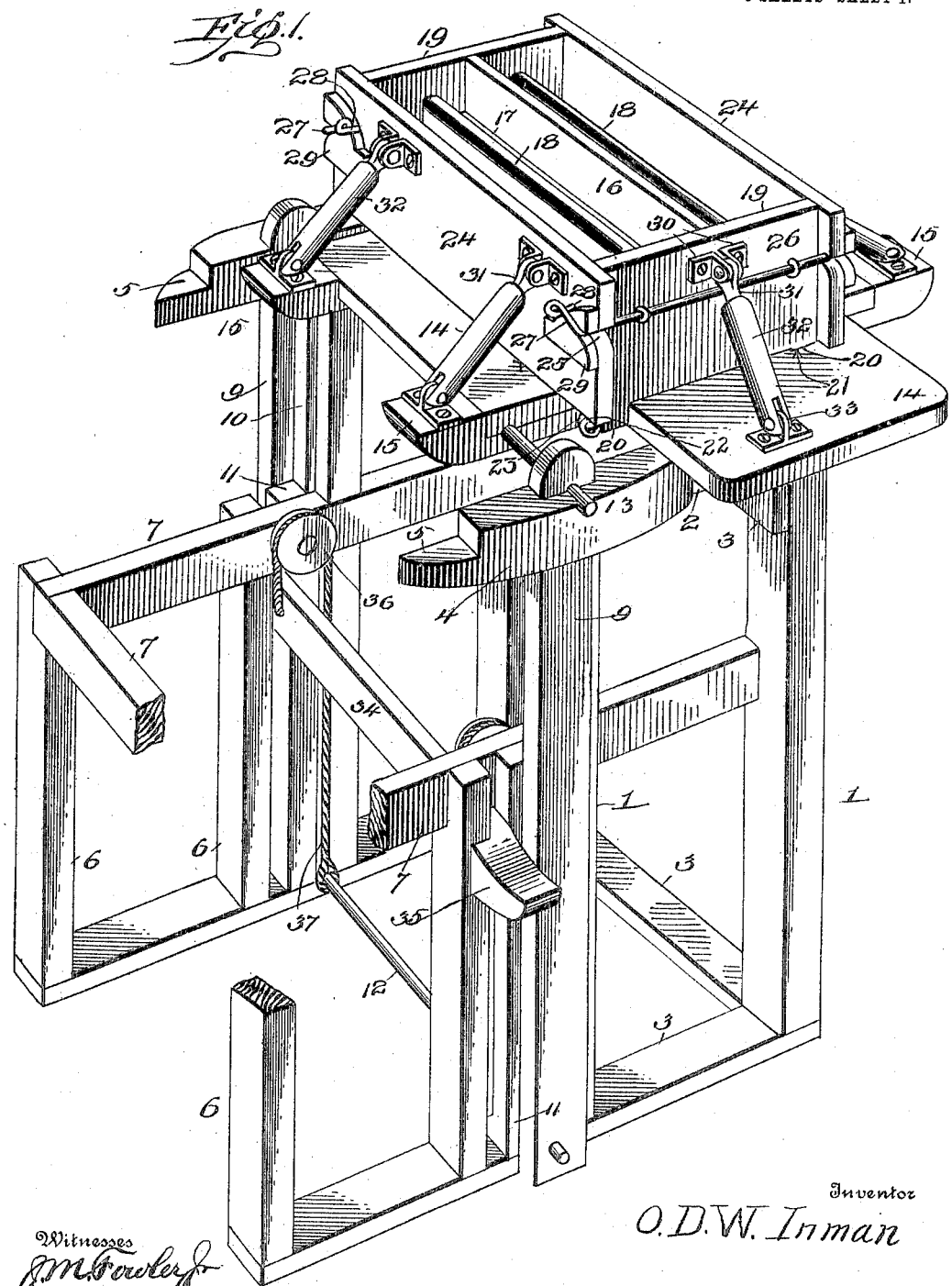

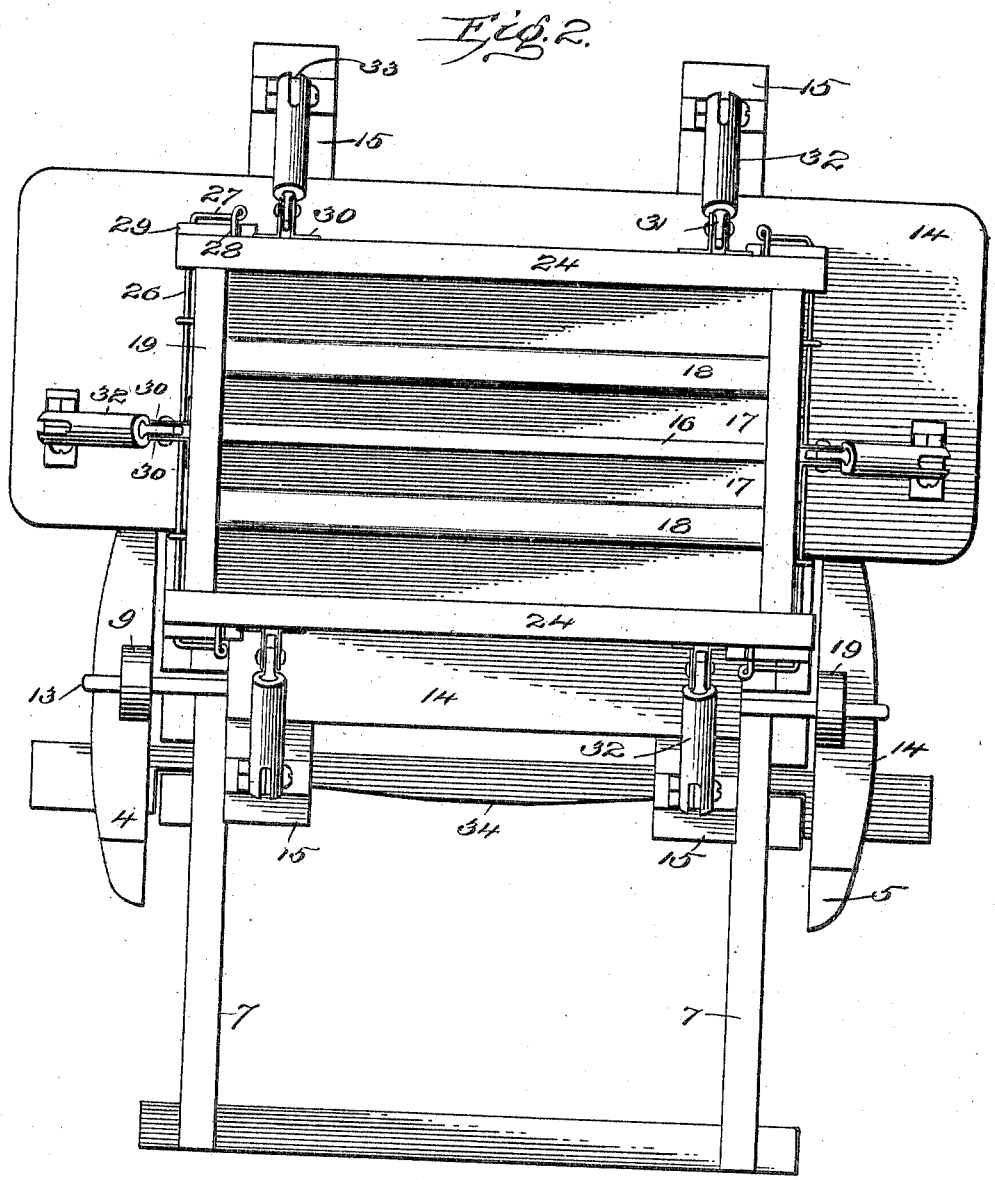

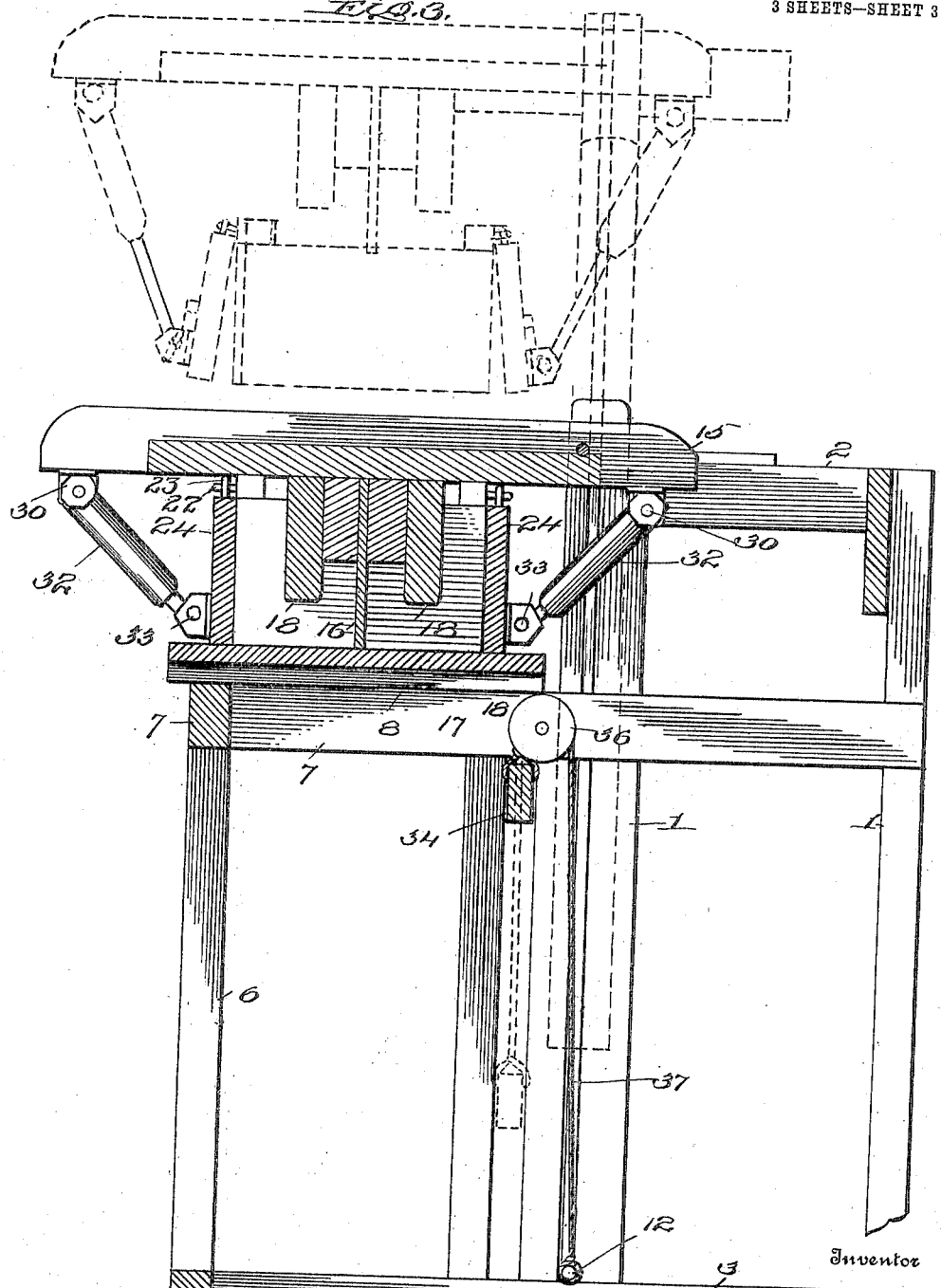

ORION D. W. INMAN, OF BELOIT, WISCONSIN.

MOLDING-MACHINE.

No. 817,489.  Specification of Letters Patent.  Patented April 10, 1906.

Application filed May 1, 1905. Serial No. 258,367.

*To all whom it may concern:*

Be it known that I, ORION D. W. INMAN, a citizen of the United States, residing at Beloit, in the county of Rock and State of Wisconsin, have invented certain new and useful Improvements in Molding-Machines; and I do hereby declare the following to be a full, clear, and exact description of the invention, such as will enable others skilled in the art to which it appertains to make and use the same.

My invention relates to molding-machines; and it is more particularly a machine for producing building-blocks of cement or other like material.

The object of the invention is to provide a durable and compact device of this character having a mold which is so constructed as to be readily inverted prior to releasing it from the formed block.

Another object is to provide means whereby the core and the sides of the mold may be simultaneously removed from the block subsequent to its inversion.

A further object is to provide a mold adapted to produce a multiplicity of blocks at one operation.

With the above and other objects in view the invention consists of a frame having a vertically-removable table which is hinged along one side and has a mold thereon, the core of which is preferably rigidly connected to the table. The walls of the mold are mounted on the table and are supported by telescopic braces secured at their ends to the wall and table, respectively. The walls are also normally held in proper relation to each other by locking device connected thereto. After a proper amount of cement or other material to form the block has been placed within the mold the table is swung upon its hinge so as to invert the mold and bring it in position upon a board or other holder located upon supports provided therefor below and adjacent the table. The walls of the mold are then unlocked, and the table is raised manually. As the only connection between the walls of the mold and the table is through the telescopic braces, it will be seen said walls will remain around the blocks until after the table and the core have moved upward a predetermined distance. The walls will then be swung simultaneously away from the blocks, which will be deposited upon the holding-board provided for them.

The invention also consists of the further novel constructions and combinations of parts hereinafter more fully described, and pointed out in the claims.

In the accompanying drawings I have shown the preferred form of my invention.

In said drawings, Figure 1 is a perspective view of my improved molding-machine, showing the mold in position to receive material for forming blocks. Fig. 2 is a plan view thereof; and Fig. 3 is a vertical longitudinal section through the machine, showing the mold inverted and showing in dotted lines the position of the mold and table when raised.

Referring to the figures by numerals of reference, 1 1 are standards of any suitable height connected by side strips 2 and by a suitable number of bracing-strips 3. Arms 4 project beyond two of the standards 1 and in alinement with the side strips 2, and these arms have their free ends reduced to form supporting-shoulders 5. Standards 6 are disposed in front of the supports 1 and connected by beams 7, which constitute a supporting-frame for a board 8, such as shown in Fig. 3. The arms 4 referred to are rigidly secured to the upper ends of slides 9, which are mounted upon the outer faces of two of the standards 1 and have guiding-beams 10, which project between said standards and posts 11, located adjacent thereto. The lower ends of the slides 9 are held in proper relation to each other by a cross-rod 12, and the upper ends are connected by a rod 13, which extends through one edge and forms a hinge for a table 14. The table rests on the side strip 2 and has parallel arms 15 extending from opposite sides thereof and between said strips 2.

Arranged longitudinally upon the table is a core of proper form. This core preferably consists of a partition 16, having at each side thereof ledges 17, provided with flanges 18 at their outer edges. End walls 19 are mounted upon the table and are adapted to contact with the ends of the core. The lower edges of these walls 19 have projections 20, and one projection of each end wall is adapted to be seated in an aperture 21, formed in the table, while each of the other projections is normally disposed between one edge of the table and one of the arms 15. Secured to each projection 20 is an eye-screw 22, each of which is loosely engaged by an eye-screw 23. These last-mentioned eye-screws are secured to side walls 24, which overlap the ends of the walls 19. The overlapping portions of the side walls are slotted, as shown at 25, to receive the ends of rods 26, which are rotatably mounted upon the walls 19. The ends of these rods have right-angle extensions 27, provided with inwardly-projecting lugs 28, and these lugs are adapted to travel upon the curved faces of blocks 29, secured to the outer surfaces of the side walls 24. It will be understood that when the lugs 28 are in position upon the blocks 29 the four walls of the mold are held firmly together and completely surround the core.

Ears 30 are secured to the outer face of each end wall 19, and pivoted between them is one end of a rod 31, which is slidably mounted in a tube 32, pivoted to an ear 33, secured to table 14. The rod and tube are so constructed as to prevent the complete withdrawal of the rod from its tube. Each side wall 24 is similarly connected to the arms 15, adjoining it.

A cross-bar 34 is slidably mounted between two standards 6 and the posts 11 and has extensions 35, which constitute treadles. Pulleys 36 are disposed adjacent the upper ends of posts 11 and support ropes 37, the ends of which are connected to bar 34 and rod 12, respectively.

In using the machine herein described the two compartments formed within the mold at opposite ends of partiton 16 are filled with the cement or other material of which the blocks are to be formed, and after this material has been properly packed a board 8 is placed on frame 7, and the table 14 is swung upon its pivot-rod 13, so as to invert it and cause its inner edge to rest on the shoulders 5.

The distance between the upper surfaces of these shoulders and the top of the board 8 is at all times equal to the distance between the upper surfaces of the table 14 and the upper edges of the walls of the mold, and therefore when the table is inverted the mold will rest on the board 8. Subsequent to the inversion of the mold the rods 26 are rotated so as to release the blocks 29 from lugs 28. Bar 24 is then depressed manually and will cause the ropes 37 to pull rod 12 and slides 9 upward. As the inverted table is supported by the arms 4 on these slides, it will be understood that the same will be carried upward thereby. However, during this upward movement of the table the tubes 32 will be partly removed from rods 31 until the partition 16 and the rest of the core has been withdrawn from the material contained in the mold. The end and side walls of the mold will then be swung away from said material and will be carried upward with the table, as shown by dotted lines on Fig. 3, and by returning the table to its normal position and lowering the slides the mold can be raised so as to permit the above operation to be repeated.

By reason of the peculiar form of the core the material deposited on the board 8 will be in the form of two similar blocks, and these can be removed with the board and dried in any suitable manner.

It will be seen that this machine is of durable and compact construction and is capable of producing a multiplicity of blocks at one operation. By employing means for withdrawing the core and then removing the walls of the mold from the molding material injury to said material during its removal from the mold is prevented. As both of these operations are performed practically simultaneously, a considerable saving of time is produced in the formation of the blocks.

When the table is swung from its normal to its inverted position, it and the mold will drop simultaneously upon the mold-board 8 before said mold and the table can change their relations and without in any wise injuring the contents of the mold.

Having thus fully described my invention, what I claim as new, and desire to secure by Letters Patent, is—

1. A machine of the character described the combination with the walls of an invertible mold and a core; of means for moving the core and laterally moving the walls at one operation, successively, while the mold is inverted.

2. In a machine of the character described the combination with an invertible mold having laterally-movable walls and a core within the mold; of means for successively moving the core and walls while the mold is inverted.

3. In a machine of the character described the combination with an invertible mold comprising laterally-movable walls and a core adapted to be removed from between the walls; of means for successively moving the core and walls at one operation while the mold is inverted.

4. In a machine of the character described the combination with a table and means for raising the same; of an invertible mold comprising laterally-movable walls and telescopic connections between the walls and table and constituting supports for the mold when inverted.

5. In a machine of the character described the combination with a table; of an invertible mold thereon comprising laterally-movable walls, and longitudinally-extensible connections between the walls and table and constituting supports for the mold when inverted and raised.

6. In a machine of the character described the combination with a table; of an invertible mold thereon comprising laterally-movable walls and telescopic means connecting said walls with the table and secured to said walls and table by fixed pivots.

7. In a machine of the character described the combination with a table; of an invertible mold comprising laterally-movable walls, means for detachably securing the walls together and telescopic connections between the walls and table and constituting supports for the mold when inverted and raised.

8. In a machine of the character described the combination with an invertible table; of a mold comprising laterally-movable and telescopic connections between the walls and the table.

9. In a machine of the character described the combination with an invertible table; of a mold having laterally-movable walls, means detachably securing the walls together, and telescopic connections between the walls and the table.

10. In a machine of the character described the combination with an invertible table and means for raising the same, of a mold having laterally-movable walls and means connecting said walls and the table for moving the walls during the upward movement of the table.

11. In a machine of the character described the combination with an invertible table and means for raising the same, of a mold comprising laterally-movable connected walls, and telescopic connections between the walls and table for operating said walls during the upward movement of the table.

12. In a machine of the character described the combination with an invertible table having a core thereon; of laterally-movable connected walls normally surrounding the core and telescopic connections between the walls and the table.

13. In a machine of the character described the combination with a supporting-frame; of an invertible table adapted to assume a position thereabove; a mold having laterally-movable walls adapted to assume a position above the frame and telescopic connections between the walls and the table.

14. In a machine of the character described the combination with a frame and supports adjacent thereto; of a vertically-movable invertible table mounted upon the supports and adapted to assume a position above the frame, means for raising the table, connected laterally-movable walls constituting a mold-box, means for detachably binding the walls together, a core upon the table and normally surrounded by the walls and slidable connections between the table and walls.

15. In a machine of the character described the combination with a frame and supports adjacent thereto; of a vertically-movable invertible table upon the supports and adapted to assume a position above the frame, a mold having laterally-movable walls, and slidable connections between said walls and the table for automatically moving the walls after the table has been properly raised, and means for raising the table.

16. In a machine of the character described the combination with an invertible table; of a mold upon, and invertible with the table and having laterally-movable walls, means for securing the walls together, and means operated by gravity for moving the walls of the inverted mold laterally when released from each other.

In testimony whereof I have signed my name to this specification in the presence of two subscribing witnesses.

ORION D. W. INMAN.

Witnesses:
EDGAR D. BULLOCK,
CLAYTON E. UDELL.